March 23, 1937.    C. K. SHARP    2,074,943
LUBRICATION
Filed March 25, 1935
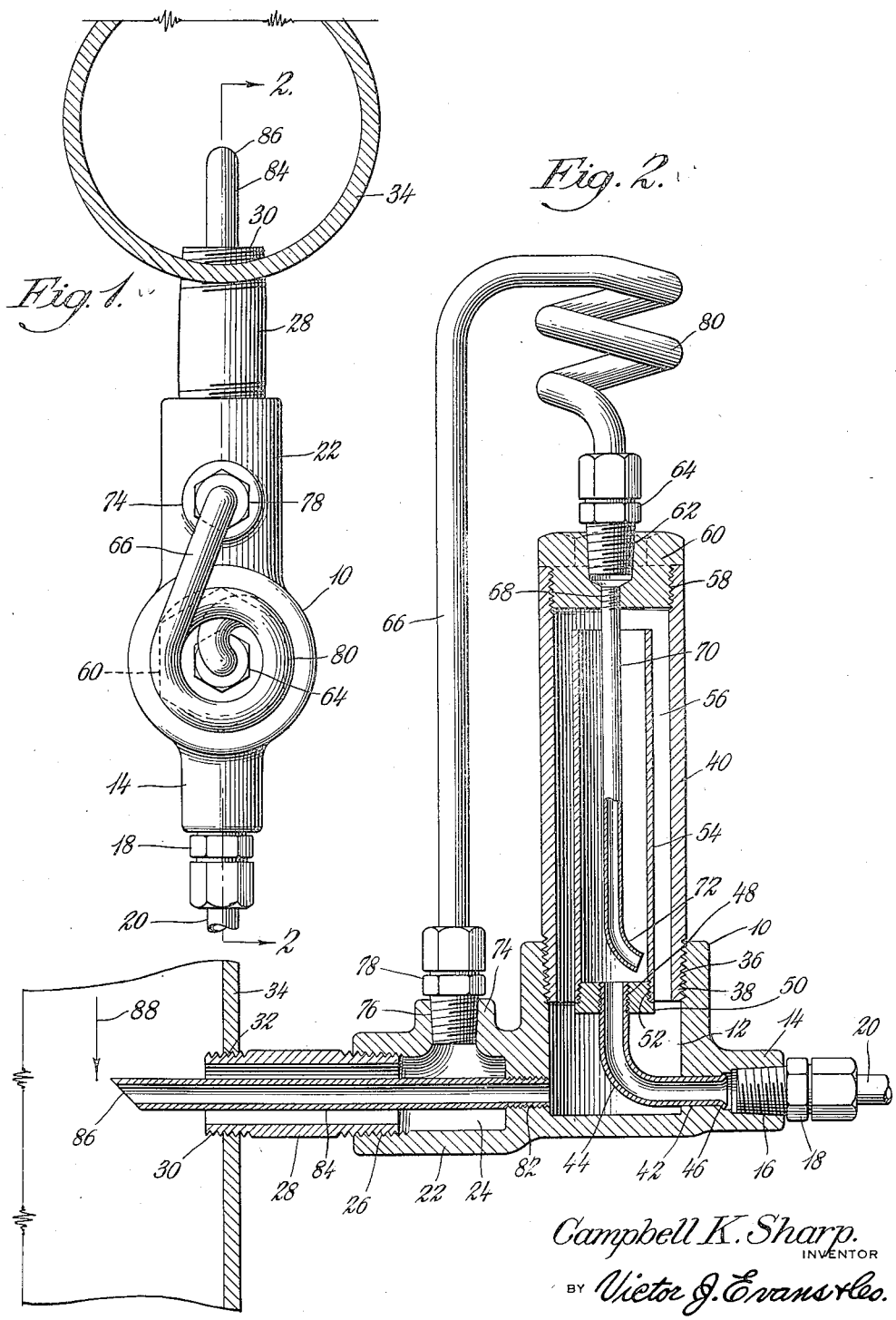
Campbell K. Sharp.
INVENTOR
BY Victor J. Evans & Co.
HIS ATTORNEYS
WITNESS:

Patented Mar. 23, 1937

2,074,943

UNITED STATES PATENT OFFICE 2,074,943

LUBRICATION

Campbell K. Sharp, Jackson, Tenn., assignor to Sharvania Oil and Grease Corporation, Memphis, Tenn., a corporation of Tennessee Application March 25, 1935, Serial No. 12,930

4 Claims. (Cl. 184—50)

My invention relates to the art of lubrication, and has among its objects and advantages the provision of an improved atomizer.

In the accompanying drawing:

Fig. 1 is a top plan view of the invention; and
Fig. 2 is a sectional view along the line 2—2 of Fig. 1.

In the embodiment selected to illustrate my invention, I make use of a fitting 10 having a large bore 12 and an extension 14 provided with a threaded opening 16 for the reception of a compression coupling 18 for connecting a feed tube 20 to the fitting. The tube 20 is connected with a lubricator of the force feed type (not shown). This fitting is provided with a second extension 22 having a bore 24 terminating in a threaded part 26 for the reception of a nipple 28 having its threaded end 30 anchored within a threaded opening 32 in a steam pipe 34. The bore 12 is threaded at 36 for the threaded end 38 of a tubular member 40.

In Fig. 2, the threaded opening 16 terminates in a smaller bore 42 for the reception of one end of a tubular elbow 44. The end of the tube is flared at 46 and may be brazed in position to provide an effective connection. The upper end of the elbow is threaded at 48 for the reception of a threaded plug 50 having a threaded connection 52 with an atomizing cup 54 positioned inside the tubular member 40. Thus, lubricant from the tube 20 is delivered to the cup 54, the upper end of which is open. It will be noted that the cup is somewhat smaller in diameter than the inner diameter of the member 40 so that a space 56 is provided.

I thread the tubular member 40 at 58 for the reception of a plug 60 having a threaded opening 62 for the reception of a compression coupling 64 associated with a condensation tube 66. The opening 62 terminates in a smaller threaded opening 68 for receiving the threaded end of a small tube 70 having its lower end terminating in close relation with the plug 50. The tube 70 delivers condensate to the bottom of the atomizing cup 54, and has its end bent at 72 to place the open end in close relation with the wall of the cup.

An extension 74 is provided upon the extension 22, which extension is bored at 76 for receiving a compression coupling 78 associated with the opposite end of the tube 66. I indicate the tube as being coiled at 80 to provide increased heat transfer area. A threaded opening 82 is provided in the fitting 10 for the reception of the threaded end of a tube 84 extending through the bore 24, the nipple 28, and into the steam pipe 34. The end of the tube projecting into the steam pipe is cut at an angle 86 and the steam in the pipe flows in the direction of the arrow 88.

In operation, steam from the pipe 34 will flow through the tube 84, into the bore 12, and upwardly around the atomizing cup 54. At the same time, steam will flow through the nipple 28, into the bore 24, and upwardly through the tube 66. Water of condensation will flow by gravity downwardly from the tube 66 and the tube 70 and be delivered to the bottom of the atomizing cup 54.

Because of the temperature of the atomizing cup 54, which is surrounded with dry steam with its attendant heat, the mixture of condensate and lubricant in the cup will boil and the lubricant and water will blend and expand together into a fogged steam condition and overflow the cup and commingle with the surrounding live steam. The expanding mixture will then seek an outlet by gravity and its own expanding force out through the tube 84 into the steam unit supply line 34. Because of the preatomized and expanded condition of the lubricant, it will thoroughly commingle and remain in an atomized condition with the whole of the steam delivered to the power unit in such a manner as to provide highly efficient lubrication for steam cylinders and other devices in which steam constitutes the vehicle for the lubricant.

My invention may be connected with steam chests, valves, or cylinders of steam operated devices in addition to the steam line illustrated. The device embodies a relatively simple connection, and makes use of a single mounting for the device, which mounting embodies a multiple function in that a double conduit system is provided in addition to the mounting function. The atomizing action is such as to function with good results for preheating and atomizing all types of oils and greases prior to the introduction of the lubricant into the steam for delivery to the parts to be lubricated.

While I have illustrated the tube 66 as being provided with the coil 80, such a coil is unnecessary in many cases, but may be found advisable in connection with high temperature installations. The invention is automatic in its operation, embodies few parts, is durable in construction, and requires no attention or adjustments. While I have mentioned the device as being connected with a lubricator of the force feed type, it will be understood that the invention will operate equally well in connection with any type of lubricator or lubricant feeding device capable of delivering lubricant to the cup 54.

Without further elaboration, the foregoing will so fully explain my invention that others may, by applying current knowledge, readily adapt the same for use under various conditions of service.

I claim:

1. In a lubricating device, a hollow shell for connection with a source of steam, an open cup mounted within the shell in spaced relation therewith and having means for connection with a source of lubricant, a steam conduit leading into said shell, and a steam conduit leading into said cup.

2. In a lubricating device, a hollow shell for connection with a source of steam, an open cup mounted within the shell in spaced relation therewith and having means for connection with a source of lubricant, a steam conduit leading into said shell, and a steam conduit leading into said cup, said last-named steam conduit including a heat exchanger.

3. A lubricator comprising a body provided with two bores separated by a wall, a tubular member having an open end secured within one of said bores, a nipple for connection with a steam line and secured within the other of said bores, an atomizing cup positioned within said tubular member and having an open upper end and a closed lower end, means attached to the closed end of the atomizing cup for connection with a source of lubricant, a conduit communicating with the other of said bores and extending into said atomizing cup through its open end and terminating in close relation with its bottom, and a steam conduit passing through said nipple, the other of said bores and said wall for delivering steam to the said one of said bores.

4. A lubricator comprising a hollow member including a conduit for delivering steam thereto from a steam line, an atomizing cup positioned inside said hollow member and having means for connection with a source of lubricant, and conduit means for conveying steam from the steam line to the atomizing cup in close relation with its bottom.

CAMPBELL K. SHARP.